Figure 1:
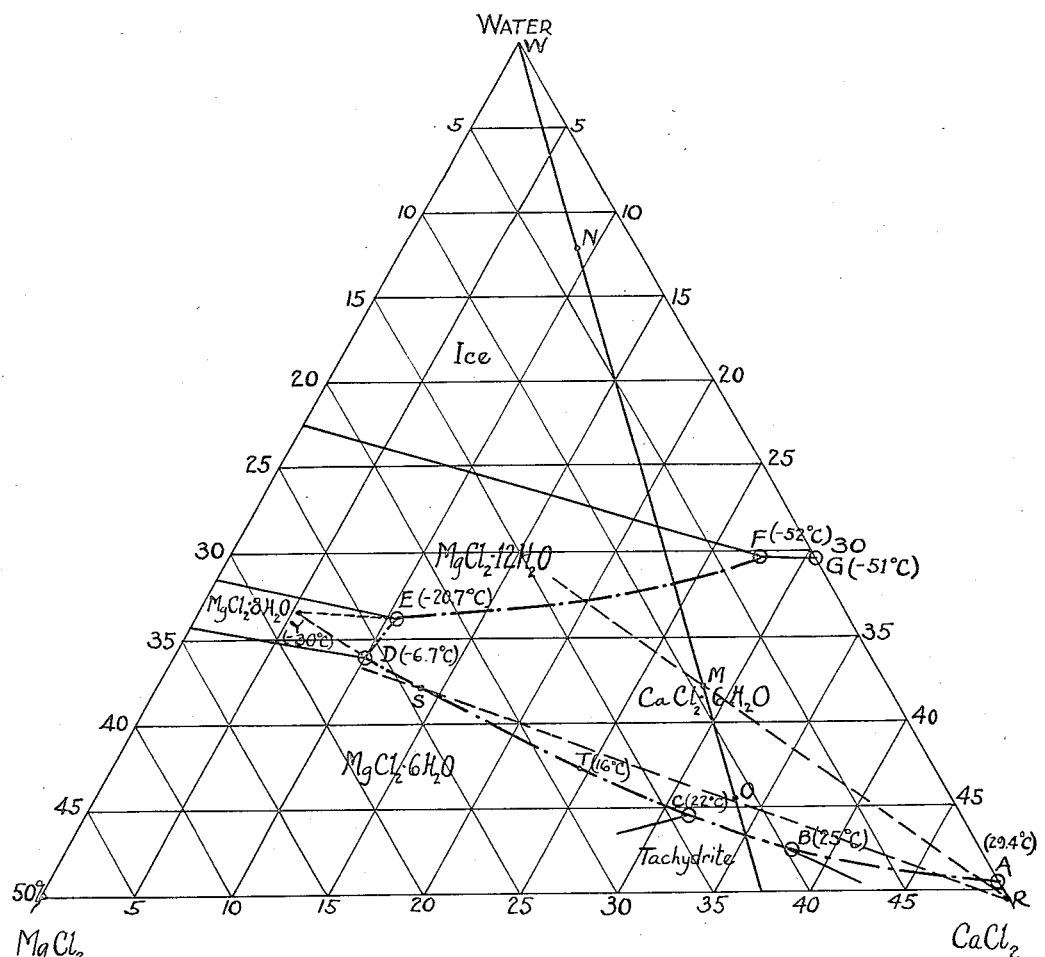

July 17, 1934. C. F. PRUTTON 1,966,832
METHOD OF CRYSTALLIZING CALCIUM CHLORIDE
Filed Dec. 14, 1931

INVENTOR
Carl F. Prutton
BY
Fay, Oberlin and Fay
ATTORNEYS

Patented July 17, 1934

1,966,832

UNITED STATES PATENT OFFICE 1,966,832

METHOD OF CRYSTALLIZING CALCIUM CHLORIDE

Carl F. Prutton, Cleveland, Ohio, assignor to The Dow Chemical Company, Midland, Mich., a corporation of Michigan Application December 14, 1931, Serial No. 580,939

6 Claims. (Cl. 23—90)

This invention relates to methods of separating calcium chloride and magnesium chloride by crystallization from mixed solutions of the two salts. The mutual solubility relationships of calcium chloride and magnesium chloride at temperatures of 16.7° C. and above are well known from the work of van't Hoff and his co-workers. I have now determined the relationships existing at temperatures below 16° C. from which a phase equilibrium diagram in such temperature range has been constructed. As a result thereof I have found and devised a new and improved method whereby calcium chloride may be separated from such mixed chloride solutions by crystallizing as the hexahydrated salt, $CaCl_2.6H_2O$, in substantially pure condition.

The method of the invention is applicable to any solution of the two chlorides in which the ratio of $$\frac{CaCl_2}{MgCl_2}$$

by weight is greater than $$\frac{16.3}{83.7}$$

i. e. greater than about ⅕, if expressed in integers. The following description sets forth in detail the steps constituting the invention, the principle of which may be most readily understood when explained by reference to the annexed drawing.

The sole figure of said drawing is a tri-linear chart illustrating the conditions of equilibrium for the system $CaCl_2$—$MgCl_2$—$H_2O$ in the range which comprises 0—50 per cent $CaCl_2$ and $MgCl_2$ and 50–100 per cent $H_2O$. The chart represents a projection in a horizontal plane of a tri-dimensional diagram in which temperature would be indicated by co-ordinates perpendicular to the plane of the drawing. In the diagram the area ABCDEFG is that in which the stable solid phase is $CaCl_2.6H_2O$; the boundary lines show the composition of the mother liquor (or liquid phase) in equilibrium with solid $CaCl_2.6H_2O$ and a second solid phase; the points B, C, D, E, and F, respectively, show the composition of the liquid phase in equilibrium with $CaCl_2.6H_2O$ and two other solid phases. The several solid phases in equilibrium with $CaCl_2.6H_2O$ along the boundary curves of the area ABCDEFG are; AB, $CaCl_2.4H_2O$; BC, $CaCl_2.2MgCl_2.12H_2O$ (tachydrite); CD, $MgCl_2.6H_2O$; DE, $MgCl_2.8H_2O$; EF, $MgCl_2.12H_2O$; FG, ice.

Each reference point likewise represents a definite temperature, shown in parentheses following the reference character on the chart, viz;— A, 29.4° C.; B, 25° C.; C, 22° C.; D, −6.7° C.; E, −20.7° C.; F, −52° C.; G, −51° C. Accordingly, the curve AB, for example, is to be understood to indicate a slope relative to an assumed perpendicular temperature axis from 29.4° C. to 25° C.; the curve BC, from 25° C. to 22° C.; the curve CD, from 22° C. to −6.7° C., etc. Intermediate temperatures may be found by interpolation on the curve connecting any two of the reference points, such as AB, BC, etc.

It will be seen that the area ABCDEFG represents the range of composition of aqueous $CaCl_2$—$MgCl_2$ solutions from which $CaCl_2.6H_2O$ may be crystallized by cooling to a suitable temperature between the extreme limits of 25° C. and −52° C. without separating any solid phase containing $MgCl_2$. When starting with more dilute solutions than those comprised within the area, preliminary evaporation may be resorted to in order to concentrate the solution sufficiently to bring its composition within the prescribed range. In practice, it is desirable to conduct the crystallization from mixed $CaCl_2$—$MgCl_2$ solutions so as to leave a mother liquor having as high a proportion of $MgCl_2$ as possible without necessity for refrigeration to extremely low temperatures. This involves cooling a suitably concentrated solution to a temperature preferably between about 16° and −6.7° C., as indicated by any point along the curve CD. It is possible to supercool a solution having a composition represented by the point D, however, to a still lower temperature than −6.7° C. with continued separation of $CaCl_2.6H_2O$ crystals but without the accompanying separation of $MgCl_2.8H_2O$ crystals which theoretically are in equilibrium therewith in such temperature range. I have found that $MgCl_2.8H_2O$ does not crystallize spontaneously at or near the equilibrium temperature, i. e. −6.7° C., unless the solution is first seeded with crystals thereof. Consequently, solutions saturated with respect to $CaCl_2.6H_2O$ and $MgCl_2.8H_2O$ may be cooled materially below the equilibrium temperature, in fact, as low as about −30° C., to produce only crystals of $CaCl_2.6H_2O$. This meta-stable range is shown on the drawing by the dotted line DY constituting a prolongation of the curve CD, and the area DYE indicates the range of composition of $CaCl_2$—$MgCl_2$ solutions from which $CaCl_2.6H_2O$ crystals may be separated at a suitable low temperature from a mother liquor supersaturated with respect to $MgCl_2.8H_2O$. The actual temperature range within which the crystallization of CaCl₂.6H₂O may be effected, therefore, is between 25° C. and −30° C., but for practical purposes it is preferable to work at a temperature below about 16° C., i. e. in a range from 16° C. to −30° C., in order to secure a high percentage separation of CaCl₂.6H₂O crystals from the mixed solution.

As an illustrative example of the practice of the invention, I will describe in detail the method of working up a mixed CaCl₂—MgCl₂ solution in which the ratio $$\frac{CaCl_2}{MgCl_2}$$

is $$\frac{3}{1}$$

by weight, the composition of the solution being approximately 9 per cent CaCl₂, 3 per cent MgCl₂ and 88 per cent H₂O, represented by point N on the drawing. Such solution is first to be concentrated sufficiently so that upon cooling to a temperature below about 16° C., e. g. 0° C., a maximum yield of CaCl₂.6H₂O crystals will be obtained without crystallization of any solid phase containing MgCl₂. The selected temperature, 0° C., is represented on the curve CD by the point S, which is determined by interpolation between the point C, 22° C.. and the point D, −6.7° C. The point S also represents the composition of the mother liquor (liquid phase) in equilibrium with the crystals of CaCl₂.6H₂O and MgCl₂.6H₂O (solid phases) at 0° C. The composition of CaCl₂.6H₂O is represented by the point R. If the solution of composition N is concentrated by evaporation its concentration will change as represented by a point moving downwardly along a line drawn from point W through point N. When the concentration has proceeded until the solution has a composition represented by point 0, where the line through WN intersects a line connecting points S and R, (which composition is 33.3 per cent CaCl₂, 11.1 per cent MgCl₂ and 55.6 per cent H₂O), cooling to 0° C. will produce a maximum crop of crystals of CaCl₂.6H₂O in a mother liquor of composition represented by S, the ratio by weight of crystals to mother liquor being as the length of the line OS is to that of the line OR. At point S the mother liquor will just reach saturation with respect to MgCl₂.6H₂O, as well as being saturated with respect to CaCl₂.6H₂O. If the concentration of the solution is stopped at a point short of point 0, cooling to 0° C. will produce a correspondingly smaller quantity of crystals in a mother liquor which is likewise short of but approaching saturation with respect to MgCl₂.6H₂O. On the other hand, concentration to a point below point 0, followed by cooling to 0° C., will produce crystals mixed with some MgCl₂.6H₂O.

In similar manner, it is possible to calculate and plot the necessary conditions of concentration and cooling for crystallizing CaCl₂.6H₂O from mixed CaCl₂—MgCl₂ solutions having any ratio of $$\frac{CaCl_2}{MgCl_2}$$

between approximately, $$\frac{1}{5},$$

represented by point Y, and $$\frac{1}{0}.$$

The temperatures for such crystallization are between 25° C. and −52° C., although preferably between 16° and −30° C. The temperature of 16° C. is represented by the point T on the drawing, which also shows the composition of the saturated mother liquor corresponding to such temperature. In practice the crystallization of CaCl₂.6H₂O will, of course, be conducted with care to avoid exceeding the limit of saturation with respect to a solid phase containing magnesium chloride. Hence, the cooling of a suitably concentrated mixed chloride solution to effect the crystallization will advisedly be carried to a point closely approaching, but not quite reaching, saturation with respect to magnesium chloride.

A commercial application of the foregoing crystallization method is found in working up natural brines occurring in the Midland, Michigan, district. The brine is first concentrated to salt out NaCl, whereby a liquor is obtained having approximately the composition 28.5 per cent CaCl₂, 9.5 per cent MgCl₂ and 62 per cent H₂O, represented by the point M. By drawing a line from point R through point M to its intersection with curve EF it will be seen that the above liquor may be cooled directly to produce crystals of CaCl₂.6H₂O, the maximum yield being obtained at about −35° C., whereat saturation with respect to MgCl₂.12H₂O is reached. Such procedure, however, will produce only a relatively small output of crystals, and the final mother liquor will still contain a relatively high percentage of CaCl₂. Further concentration of the original liquor is, therefore, desirable prior to carrying out the crystallization. For instance, the liquor is preferably to be concentrated by evaporating to a composition containing from 54 to 56 per cent water, represented approximately by the point 0, whereupon cooling to 0° C., or thereabout, according to the procedure previously described, will produce a much greater yield of CaCl₂.6H₂O crystals and leave a mother liquor with a much lower CaCl₂ content and correspondingly higher MgCl₂ content.

The hexahydrate crystals produced according to my improved method may be readily filtered from the mother liquor, conveniently by centrifuging or other suitable means, and after washing with a small amount of water are obtained in substantially pure form free from magnesium chloride. From the mother liquor magnesium chloride may be separated by appropriate crystallization methods. For instance, the mother liquor corresponding to the point S on the drawing, which has a composition of approximately 14 per cent CaCl₂, 24 per cent MgCl₂ and 62 per cent H₂O, may be evaporated further and then cooled to precipitate crystals of MgCl₂.6H₂O, according to known procedure as shown by the publications of van't Hoff previously referred to.

The essential feature of the invention, concisely defined to summarize the foregoing detailed description, consists in providing a calcium chloride-magnesium chloride solution having any composition within the limits represented by the area ABCDEFG of the drawing, cooling the same to a suitable temperature below 16° C., preferably between 16° and −30° C., to precipitate crystals of CaCl₂.6H₂O in a mother liquor saturated with respect thereto but unsaturated, or just saturated, with respect to a crystallizable solid phase containing MgCl₂, and separating the crystals from the mother liquor.

This application is a continuation in part of my prior application Serial No. 291,495, filed July 9, 1928.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. In a method of separating calcium chloride from a mixed solution of calcium chloride and magnesium chloride in which the ratio by weight of $$\frac{CaCl_2}{MgCl_2}$$

is greater than $$\frac{1}{5},$$

the step which consists in crystallizing calcium chloride as the hexahydrated salt $CaCl_2.6H_2O$ from such mixed solution which is saturated with respect thereto at a temperature below 16° C. but unsaturated with respect to a crystallizable solid phase containing magnesium chloride.

2. In a method of separating calcium chloride from a mixed solution of calcium chloride and magnesium chloride in which the ratio by weight of $$\frac{CaCl_2}{MgCl_2}$$

is greater than $$\frac{1}{5},$$

the step which consists in crystallizing such calcium chloride as the hexahydrated salt $CaCl_2.6H_2O$ from such mixed solution saturated with respect thereto at a temperature between 16° and —30° C. but unsaturated with respect to a crystallizable solid phase containing magnesium chloride.

3. In a method of separating calcium chloride from a mixed solution of calcium chloride and magnesium chloride in which the ratio by weight of $$\frac{CaCl_2}{MgCl_2}$$

is greater than $$\frac{1}{5},$$

the steps which consist in producing in such solution a water content corresponding to supersaturation with respect to $CaCl_2.6H_2O$ at a selected temperature below 16° C. but short of supersaturation at such temperature with respect to a crystallizable solid phase containing magnesium chloride, cooling to a point not lower than such selected temperature to crystallize $CaCl_2.6H_2O$ from the solution and separating the crystals from the mother liquor.

4. In a method of separating calcium chloride from a mixed solution of calcium chloride and magnesium chloride in which the ratio by weight of $$\frac{CaCl_2}{MgCl_2}$$

is greater than $$\frac{1}{5},$$

the steps which consist in producing in such solution a water content corresponding to supersaturation with respect to $CaCl_2.6H_2O$ at a selected temperature between 16° and —30° C. but short of supersaturation at such temperature with respect to $MgCl_2.6H_2O$, cooling to a point not lower than such selected temperature to crystallize $CaCl_2.6H_2O$ from the solution and separating the crystals from the mother liquor.

5. In a method of separating calcium chloride from a mixed solution of calcium chloride and magnesium chloride in which the ratio by weight of $$\frac{CaCl_2}{MgCl_2}$$

is greater than $$\frac{1}{5},$$

the steps which consist in concentrating such solution to the point such that, when cooled to a selected temperature between 16° and —30° C., $CaCl_2.6H_2O$ will be crystallized out from a mother liquor unsaturated with respect to $MgCl_2.6H_2O$, cooling the concentrated solution to approximately such selected temperature and separating the crystals of $CaCl_2.6H_2O$ from the mother liquor.

6. The method of separating calcium chloride from a solution thereof containing magnesium chloride in which the ratio by weight of $$\frac{CaCl_2}{MgCl_2}$$

is approximately $$\frac{3}{1},$$

which comprises concentrating such solution by evaporation to a water content of about 54 to 56 per cent, cooling to a temperature between 16° and —30° C. and separating crystals of $CaCl_2.6H_2O$ from the mother liquor.

CARL F. PRUTTON.